March 22, 1960   A. L. SCHAWLOW ET AL   2,929,922
MASERS AND MASER COMMUNICATIONS SYSTEM
Filed July 30, 1958
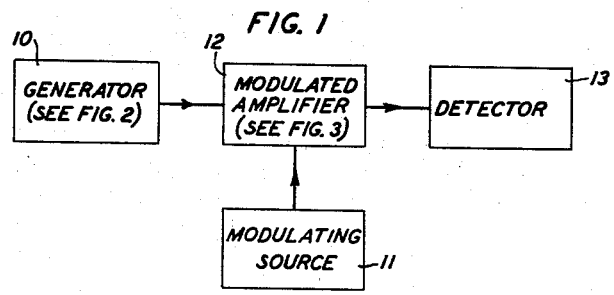
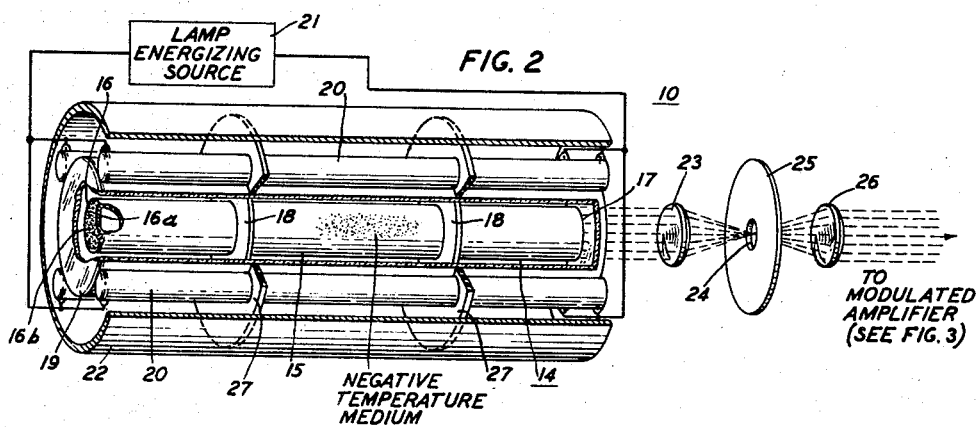
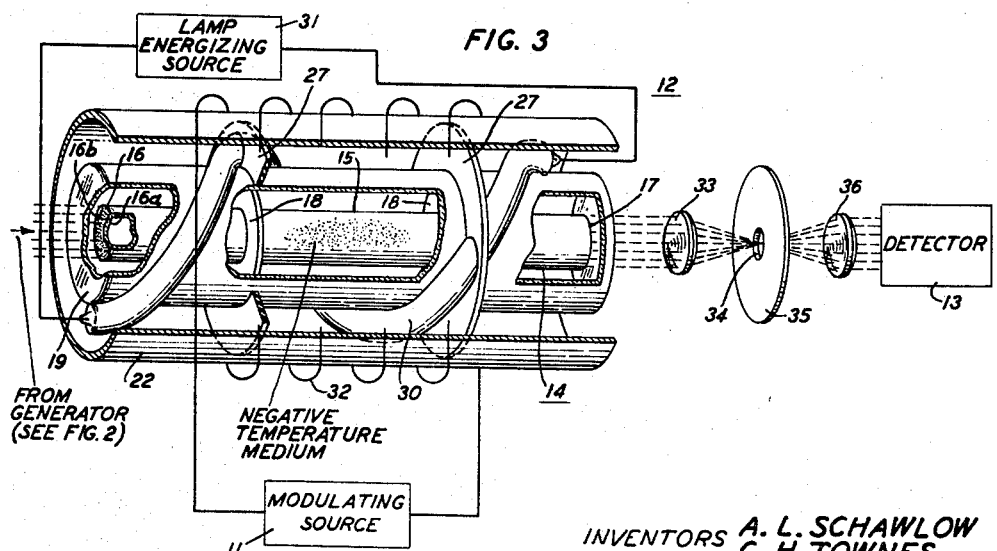
INVENTORS A. L. SCHAWLOW
C. H. TOWNES
BY Lucian C. Canepa
ATTORNEY

United States Patent Office 2,929,922
Patented Mar. 22, 1960

2,929,922
MASERS AND MASER COMMUNICATIONS SYSTEM

Arthur L. Schawlow, Madison, N.J., and Charles H. Townes, New York, N.Y., assignors to Bell Telephone Laboratories, Incorporated, New York, N.Y., a corporation of New York Application July 30, 1958, Serial No. 752,137

11 Claims. (Cl. 250—7)

This invention relates to the generation and amplification of infrared, visible, and ultraviolet waves, and more particularly to the generation and amplification of such waves by means of devices including media in which the stimulated emission of radiation occurs; devices of this type are now generally termed "masers."

It is characteristic of a maser that it employs a medium in which there is established at least intermittently a nonequilibrium population distribution in a pair of spaced energy levels of its energy level system. In particular, the population of the higher of the selected pair of energy levels may be made larger than that of the lower. It is now usual to describe a medium which is in such a state of nonequilibrium as exhibiting a negative temperature. It is known that a competing process known as relaxation tends to return the system to equilibrium.

It is characteristic that if there be applied to a medium which is in a negative temperature state a signal of a frequency which satisfies Planck's law with respect to the two energy levels which are in nonequilibrium $$\left(\nu = \frac{E_2 - E_1}{h} \text{ where } h \text{ is Planck's constant}\right)$$

then the applied signal will stimulate the emission of radiation at the signal frequency from the medium and the signal will be amplified.

Among the more promising forms of masers known is one which employs as the negative temperature medium a material whose energy level system is characterized by at least three energy levels, with the separations of these three energy levels falling within desired operating frequency ranges. To this material, there is supplied pumping power which effects transitions from the lowest to the highest of the selected three energy levels. By power saturation of the highest energy level, whereby the populations of the highest and lowest energy levels tend to be equalized, there is established in one of these two energy levels a nonequilibrium population distribution with respect to the intermediate energy level of the selected three, whereby a negative temperature results in the material. Thereafter a signal of appropriate frequency can be amplified by being applied thereto in a manner such that the emission of radiation is stimulated therefrom.

It is to be noted that the process of relaxation from randomly overpopulated states may give rise to spontaneous emission, that is, emission caused by radiative transitions in a mode other than the desired or stimulated one.

Generators and amplifiers employing atomic and molecular processes, as do the various known varieties of masers, may in principle be extended in operation far beyond the range of frequencies which have been generated and amplified by electronic processes. As, however, the maser concept is applied to the translation of wavelengths in the infrared, visible, and ultraviolet regions of the electromagnetic wave spectrum, it is found that conventional or microwave maser techniques and structures are suitable neither for the generation of monochromatic radiation nor to provide coherent amplification.

Accordingly, an object of the present invention is a system, including a maser, for translating infrared, visible, and ultraviolet energy.

A maser designed for operation in the microwave range of the spectrum might, for example, comprise a cavity having therein an ensemble of atomic or molecular systems, the cavity being characterized by being able to support only one mode near the frequency which corresponds to the desired radiative transitions of the systems. Alternatively, such an ensemble might be located in a waveguide, which similarly would be characterized by one, or a very few, preferred modes of propagation in the frequency range of interest.

Thus, the energy emitted by a maser operating in the microwave range is typically monochromatic, due to the energy produced by stimulated emission being very much larger than the background of radiation caused by spontaneous emission. In other words, such devices are inherently monochromatic because stimulated emission produces completely coherent amplification, and spontaneous emission, which is not so coherent, is characteristically small by comparison with the stimulated emission.

On the other hand, the maintenance of a single isolated mode is a maser cavity operating at frequencies above those in the microwave range requires an impractically small cavity structure (of the order of one wavelength) and/or a high and not easily realizable density of pumping power. Hence, one is led to consider, in these higher frequency ranges, cavities which are large compared to a wavelength, and which are accordingly capable of supporting a large number of modes within the frequency ranges of interest. A disadvantage of this approach, however, is that masers including such cavities must be operated at relatively high power levels in order that the emission stimulated therefrom be at least as large as that spontaneously emitted therefrom.

Accordingly, another object of this invention is a practically realizable, efficient, low-noise maser structure which is capable of the generation of monochromatic radiation, or coherent amplification, in the infrared, visible, and ultraviolet portions of the electromagnetic spectrum.

The above and other objects of the present invention are realized in an illustrative embodiment thereof wherein a negative temperature medium is disposed between two spaced parallel reflecting plates in a configuration which is of practical size and which may be pumped by readily available power sources, and wherein a single mode corresponding to the stimulated emission can be effectively isolated.

More particularly, one specific illustrative embodiment of the present invention comprises a maser including a chamber having reflective end parallel plates and side walls. Positioned within the chamber is a negative temperature medium, which is pumped by an energy source disposed about the chamber. The side walls are transparent to the pumping energy and either transparent to or absorptive of other energy radiated thereat. Further, an optical configuration is arranged adjacent to one of the end plates of the chamber for isolating the one mode of those supported within the chamber which it is desired to selectively utilize.

The principles of the present invention may illustratively be embodied in a communications system which comprises a maser device capable of generating monochromatic radiation, a second maser device capable of modulating and coherently amplifying the output of the maser generator, and a device for detecting the output of the second maser. Alternatively, such a system may include a maser generator whose output is modulated by a nonamplifying device, or a system in which the maser generator itself is modulated.

Thus, a feature of the present invention is a system for communicating information by means of energy having wavelengths in the infrared, visible, or ultraviolet portions of the electromagnetic spectrum, comprising a monochromatic generator, a modulatable coherent amplifier, and a detector.

Another feature of this invention is a maser generator including a chamber comprising reflective parallel end members and side members, a negative temperature medium within said chamber, a pumping power source disposed about the side members, the side members being transparent to the pumping energy and either transparent to or absorptive of other energy radiated thereat, and a configuration arranged adjacent to one of the end members for abstracting from the chamber a selected one of the modes supported therein, whereby there is provided efficient, low-noise, monochromatic generation of infrared, visible, or ultraviolet waves.

A further feature of the present invention is a maser amplifier including a chamber comprising reflective parallel end members and side members, a negative temperature medium within said chamber, a pumping power source disposed about the side members, the side members being transparent to the pumping energy and nonreflective of other energy radiated thereat, and a configuration arranged adjacent to one of the end members for abstracting from the chamber an amplified replica of a wave fed through the other end member thereof, whereby there is provided an efficient, low-noise, coherent amplifier of infrared, visible, or ultraviolet waves.

A still further feature of this invention is an arrangement for modulating the signal output of a maser of the type herein-described comprising a structure for establishing a magnetic field parallel to the longitudinal axis of the chamber thereof, and an information source capable of varying the magnetic field in correspondence with the output of the source.

The principles of the present invention will be better understood from the following more detailed discussion taken in conjunction with the accompanying drawing, in which:

Fig. 1 is a block diagram of a communications system illustratively embodying aspects of the principles of the present invention;

Fig. 2 is a perspective view of a generator made in accordance with the principles of this invention; and Fig. 3 is a perspective view of an amplifier embodying the principles of the present invention. Also, Fig. 3 depicts a modulating source and a detector, arranged in typical relationship to the amplifier.

Referring now to Fig. 1, there is shown a communications system in which the principles of the present invention are illustratively embodied. The system includes a generator or oscillator 10, a modulating source 11, a modulated amplifier 12, and a detector 13.

The generator 10, which is shown in detail in Fig. 2, includes a chamber 14, which typically may be about one centimeter in diameter and ten centimeters in length. The chamber 14 comprises a hollow cylinder 15 having its ends capped by two flat parallel assemblies 16 and 17. Disposed within the chamber 14 is a negative temperature material whose radiative energy level separations correspond to frequencies in the ranges of interest, namely, the infrared, visible, and ultraviolet ranges.

Various materials are suitable for use as the active or negative temperature medium of maser devices of the general type described herein. For example, vapors of the alkali metals; namely, lithium, sodium, potassium, rubidium and cesium, and some solid rare earth salts, for example, anhydrous chlorides of europium and samarium, may be so used.

In particular, potassium maintained at a temperature of about 435 degrees Kelvin, at which temperature it exhibits a vapor pressure of about 0.001 millimeter, may advantageously be included in a specific illustrative embodiment of the principles of the present invention as the active medium thereof.

Each of the flat parallel assemblies 16 and 17 of the device shown in Fig. 2 advantageously includes as a component part thereof a material which reflects most of the energy incident thereupon. Thus, for example, an assembly comprising sapphire 16a, which material is characterized by good chemical inertness and excellent transmission properties, particularly for infrared wavelengths, and having a coating of gold 16b, typically about 500 angstrom units thick, on the outer surface of the sapphire member, may be included in specific embodiments of this invention. Such an assembly exhibits 97 percent reflectivity, 2 percent absorptivity, and 1 percent transmitivity to wavelengths in the infrared range.

The inner and outer parallel faces of each sapphire plate reflect a small portion of the radiation directed thereat. Therefore, the thickness of the sapphire plates should advantageously be chosen such that the reflections from the two faces of each plate add in phase.

It is noted that the phase angle between the reflections from the two faces or surfaces of each sapphire member depends on the thickness and refractive index thereof. Since sapphire is crystalline and the refractive index is different for ordinary and extraordinary rays, the thickness may be chosen to give constructive interference for one polarization and destructive interference for the polarization perpendicular thereto, in that manner discriminating between modes traveling in the same direction but having different polarizations.

The cylinder 15 of the chamber 14 is advantageously of a material which is transparent to the pumping energy and either transparent to or absorptive of other radiation impinging thereupon, thereby both to allow the negative temperature medium within the cylinder 15 to be pumped and to eliminate from the chamber radiation occurring in all modes except those corresponding to waves which travel back and forth between the reflective assemblies 16 and 17. These reflected modes are coupled much more strongly to the excited atomic systems of the negative temperature medium than any other modes and hence would be strongly favored for maser oscillations.

In those specific embodiments of the present invention in which the negative temperature medium within the chamber 14 is at a pressure other than atmospheric, as in the case of the potassium vapor, for example, it is advantageous to support the chamber 14, by means of spacer elements 18, within a protective shell 19, typically of glass, within which shell a pressure approximately equal to that within the chamber 14 is maintained. In this manner, the resultant forces acting on the opposing faces of the end assemblies 16 and 17 are made so small as not to be capable of distorting the assemblies and thereby disturbing their parallelism.

Arranged around the protective shell 19 are a plurality of pumping sources 20 which, in a maser generator including potassium vapor as the active medium thereof, may advantageously comprise an assembly of potassium lamps, which lamps 20 are energized by a source 21.

The maser generator shown in Fig. 2 further includes a housing 22 in which the protective shell 19 is supported by spacer elements 27. The inner surface of the housing 22 is of a material which is capable of reflecting a major part of the energy radiated thereupon from the pumping power sources 20, thereby to aid in directing a substantial portion of the energy emitted by the sources 20 toward the chamber 14 and into the negative temperature medium therein.

The process of oscillation within a maser generator made in accordance with the principles of the present invention depends on the selective regeneration within the chamber 14 of a component of the energy spontaneously emitted by the negative temperature medium therein.

Mode selection in the maser generator shown in Fig. 2 is based on the phenomenon that, when energy is radiated from a chamber of the type herein-described through an end plate member which is large compared to the wavelength of the radiation, each mode radiates in a characteristic direction. Thus, if the emitted radiation is focused by a lens, each point in the focal plane thereof will correspond to a mode of a particular direction, affording thereby a separation of modes. And, if radiation falling on a very limited area in the focal plane is detected, that radiation will represent spontaneous and stimulated emission from a selected and limited number of modes, the large background of spontaneous emission produced in other modes being thereby effectively isolated.

The principles of this phenomenon are utilized in the maser generator shown in Fig. 2. Radiation in the desired mode is transmitted through the end assembly 17 and focused by a double-convex lens 23 arranged such that the desired energy is directed through an aperture 24 in an absorptive sheet 25 which lies in the focal plane of the lens 23. A second double-convex lens 26 is employed to reconvert the selected energy to the form of a plane wave, in which form the desired energy radiates to the modulated amplifier 12.

The maser amplifier shown in Fig. 3 is similar in structure to the generator described above. The amplifier includes a chamber 14 comprising a hollow cylinder 15 supported within a protective shell 19 by supporting members 18 and within which cylinder 15 there is disposed a suitable negative temperature medium. The shell 19 is supported within a reflective housing 22 by spacer or supporting members 27.

Arranged about the protective shell 19 of the amplifier 12 shown in Fig. 3 is a pumping power assembly 30 which may advantageously comprise, in a specific illustrative embodiment of the present invention wherein the negative temperature medium is potassium vapor, a potassium lamp formed in the shape of a spiral, which spiral lamp is energized by a source 31.

Energy which is directed from the generator 10 through the left-hand end of the cylinder 15 of the amplifying device of Fig. 3 may be modulated by an assembly including a coil 32 for establishing a magnetic field parallel to the longitudinal axis of the cylinder 15 and a source 11 for varying the strength of the longitudinal magnetic field, whereby broadening or splitting of the spectral lines emitted by the device 12 in correspondence with the variation of the magnetic field results, which phenomenon is generaly termed the Zeeman effect.

The device 12 shown in Fig. 3 radiates through the right-hand end of the cylinder 15 an amplified counterpart of the energy directed at the device 12 by the generator 10. The radiated energy is directed by two lenses 33 and 36 through an aperture 34 in an absorptive member 35 and to a detector 13. The detector 13 may, for example, include a photomultiplier tube.

It is noted that the admission of a signal into the region between the two end parallel plates of the amplifying device 12 is similar to the process involved in a microwave cavity. More particularly, the partially reflecting surfaces of the end plates are analogous to coupling holes; and, if a monochromatic plane wave strikes the outside of one of the partially reflecting surfaces, energy will build up in the region between the plates, and the relations between input wave, energy in the "cavity," and output wave correspond to those for a microwave impinging on an appropriate cavity with input and output coupling holes.

Thus, it is seen that the principles of the present invention may illustratively be embodied in monochromatic maser generators of infrared, visible, or ultraviolet wavelengths. It is feasible to tune such generators by varying the pressure or temperature of the negative temperature media thereof. Alternatively, tuning of such devices may be based on the Stark effect (i.e., observed changes in the spectrum of a system when the system is subjected to an electric field) or on the Zeeman effect.

Further, it has been shown that embodiments of this invention include coherent maser amplifiers of infrared, visible, or ultraviolet wavelengths. It is to be noted that these devices are capable of amplifying energy of these wavelengths with no significant change in the wavefront or phase thereof.

It is to be noted that maser devices embodying the principles of the present invention may advantageously be utilized in various spectroscopy and measurement applications, as well as in the communications field.

It is to be understood that the various specific embodiments disclosed are merely illustrative of the general principles of the invention. Thus, although the amplifying chamber 14 has been shown and described as including a hollow cylinder, it is of course clear that any other transparent structure (more specifically, transparent to the pumping energy and transparent to or absorptive of other radiation) suitable for retaining the negative temperature medium and including reflective end assemblies may be easily substituted therefor.

What is claimed is:

1. A communications system for operation in the infrared, visible, or ultraviolet regions of the electromagnetic wave spectrum comprising a monochromatic maser generator, a coherent modulated maser amplifier, a modulating source, and a detector; said generator comprising a chamber having end reflective parallel members and transparent side members, a negative temperature medium disposed within said chamber, and means arranged about said chamber for pumping said medium; said amplifier comprising a chamber having end reflective parallel members and transparent side members, a negative temperature medium disposed within said chamber, means arranged about said chamber for pumping said medium, and coupling means for abstracting from one end of said chamber an amplified counterpart of the energy transmitted into the other end thereof and for directing said amplified counterpart at said detector.

2. A communications system for operation in the infrared, visible or ultraviolet regions of the electromagnetic wave spectrum comprising a monochromatic maser generator, a coherent maser amplifier, said generator and amplifier including means for modulating the output of said generator in accordance with signal information, and a detector; said generator comprising a chamber having a length which is substantially greater than its transverse dimension and having partially reflective parallel end members and nonreflective side members, a negative temperature medium disposed within said chamber and characterized by at least three distinct energy levels, two of which have a separation in the frequency range of interest, means for pumping said medium so that a population inversion is produced therein between said two separated energy levels, and means for abstracting from said chamber and directing at the amplifier input the energy of a particular mode of electromagnetic vibration; said amplifier comprising a chamber having a length which is substantially greater than its transverse dimension and having partially reflective parallel end members and nonreflective side members, a negative temperature medium disposed within said chamber and characterized by at least three distinct energy levels, two of which have a separation in the frequency range of interest, means for pumping said medium so that a population inversion is produced therein between said two separated energy levels, means for abstracting from said chamber the energy of a particular mode of electromagnetic vibration representing an amplified and modulated replica of the generator output, and means for directing said replica at said detector.

3. A communications system for operation in the infrared, visible, or ultraviolet regions of the electromagnetic wave spectrum comprising a monochromatic maser generator, a coherent modulated maser amplifier, a modulating source, and a detector; said amplifier including means defining an amplifying chamber, and means for establishing a magnetic field parallel to the longitudinal axis of said chamber, said modulating source being coupled to said magnetic means, the radiative output of said generator being directed at said amplifier, and the radiative output of said amplifier, constituting an amplified and modulated counterpart of the energy radiated thereinto, being directed at said detector.

4. A maser generator comprising a chamber having end reflective parallel members and side members, a negative temperature medium disposed within said chamber, and means arranged about said chamber for pumping said medium, said side members being transparent to the pumping energy and transparent to or absorptive of other energy radiated thereat.

5. A maser generator for operation in the infrared, visible or ultraviolet regions of the electromagnetic wave spectrum comprising a chamber having a length which is substantially greater than its transverse dimension and having partially reflective parallel end members and non-reflective side members, a negative temperature medium disposed within said chamber and characterized by at least three distinct energy levels, two of which have a separation in the frequency range of interest, means for pumping said medium so that a population inversion is produced therein between said two separated energy levels, and means for abstracting from said chamber and directing at an amplifier input the energy of a particular mode of electromagnetic vibration.

6. A maser generator as in claim 5 wherein said mode selecting means includes an absorptive member having an opening therethrough, said absorptive member being positioned adjacent to one end of said chamber, and means for directing a selected portion of the energy radiated by said generator through said opening.

7. A maser generator as in claim 5 wherein said negative temperature medium comprises potassium, and said pumping means comprises an assembly of potassium lamps.

8. A maser amplifier comprising a chamber having end reflective parallel members and said members, a negative temperature medium disposed within said chamber, means arranged about said chamber for pumping said medium, said side members being transparent to the pumping energy and non-reflective of other energy radiated thereat, and coupling means for abstracting from one end of said chamber an amplified counterpart of the energy directed into the other end thereof.

9. A maser amplifier for operation in the infrared, visible or ultraviolet regions of the electromagnetic wave spectrum comprising a chamber having a length which is substantially greater than its transverse dimension and having partially reflective parallel end members and non-reflective side members, a negative temperature medium disposed within said chamber and characterized by at least three distinct energy levels, two of which have a separation in the frequency range of interest, means for pumping said medium so that a population inversion is produced therein between said two separated energy levels, and means for abstracting from said chamber and directing at a detector the energy of a particular mode of electromagnetic vibration.

10. A maser amplifier as in claim 9 wherein said negative temperature medium comprises potassium, and said pumping means comprises an assembly of potassium lamps.

11. A modulated maser amplifier comprising a chamber having end reflective parallel members, a negative temperature medium disposed within said chamber, means arranged about said chamber for pumping said medium, means coupled to and under the control of a modulating source for establishing a magnetic field parallel to the longitudinal axis of said chamber, and means for abstracting from one end of said chamber an amplified counterpart of the energy directed into the other end thereof, which counterpart is modulatable in accordance with the output of said source.

References Cited in the file of this patent

UNITED STATES PATENTS 2,836,722    Dicke et al. ------------ May 27, 1958